United States Patent
Park et al.

(10) Patent No.: US 9,323,330 B2
(45) Date of Patent: *Apr. 26, 2016

(54) APPARATUS AND METHOD FOR PROVIDING TACTILE SENSATION FOR VIRTUAL IMAGE

(71) Applicant: INDUSTRY-UNIVERSITY COOPERATION FOUNDATION HANYANG UNIVERSITY, Seoul (KR)

(72) Inventors: Jong-Il Park, Seoul (KR); Byung-Kuk Seo, Seoul (KR); Dae-Sun Lee, Seoul (KR); Jung-Sik Park, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 60 days.

This patent is subject to a terminal disclaimer.

(21) Appl. No.: 14/236,475

(22) PCT Filed: Dec. 14, 2012

(86) PCT No.: PCT/KR2012/010926
§ 371 (c)(1),
(2) Date: Jan. 31, 2014

(87) PCT Pub. No.: WO2013/089494
PCT Pub. Date: Jun. 20, 2013

(65) Prior Publication Data
US 2014/0160082 A1    Jun. 12, 2014

(30) Foreign Application Priority Data

Dec. 15, 2011  (KR) .................. 10-2011-0135408
Oct. 29, 2012  (KR) .................. 10-2012-0120737

(51) Int. Cl.
*G06F 3/01* (2006.01)
*G06F 3/03* (2006.01)
(Continued)

(52) U.S. Cl.
CPC .............. *G06F 3/016* (2013.01); *G06F 3/0304* (2013.01); *G06F 3/042* (2013.01); *H04M 1/72519* (2013.01); *H04M 2250/52* (2013.01); *H04N 21/41407* (2013.01); *H04N 21/8583* (2013.01)

(58) Field of Classification Search
None
See application file for complete search history.

(56) References Cited

U.S. PATENT DOCUMENTS 6,113,395 A * 9/2000 Hon .............................. 434/262
8,239,145 B2 * 8/2012 Suzuki .................... G06F 3/016
                                                    345/156

(Continued)

FOREIGN PATENT DOCUMENTS

JP    2001-273503 A    10/2001
JP    2008-129835 A    6/2008

(Continued)

OTHER PUBLICATIONS

Google patents English translation of JP 2008-129835 A.*

(Continued)

*Primary Examiner* — Kent Chang
*Assistant Examiner* — Nathan Brittingham
(74) *Attorney, Agent, or Firm* — Ladas & Parry LLP (57) ABSTRACT

An apparatus and a method for providing a tactile sensation for a virtual image are disclosed. The disclosed apparatus includes: a display unit for displaying an image including a virtual image; an image acquisition unit for acquiring an image of a user body; a determiner unit for determining whether or not a user attempts an interaction with the virtual image by using an image acquired by the image acquisition unit; a content analyzer unit for acquiring a time at which a virtual image is shown and position information of the shown virtual image from a displayed content; a tactile-sensation provider unit for providing a tactile sensation to a preset body part of the user based on a determination result of the determiner unit; and a tactile-sensation provision controller for adjusting an ejector nozzle of the tactile-sensation provider unit based on a virtual image showing time and position acquired by the content analyzer unit. The disclosed apparatus can enable the user to interact with a virtual image with verisimilitude.

14 Claims, 6 Drawing Sheets

(51) Int. Cl.
*H04M 1/725* (2006.01)
*G06F 3/042* (2006.01)
*H04N 21/414* (2011.01)
*H04N 21/858* (2011.01)

(56) References Cited

U.S. PATENT DOCUMENTS

| | | | |
|---|---|---|---|
| 2004/0210933 A1* | 10/2004 | Dresti et al. | 725/40 |
| 2009/0237372 A1* | 9/2009 | Kim | G06F 3/044 345/173 |
| 2010/0110384 A1* | 5/2010 | Maekawa | G02B 5/124 353/10 |
| 2010/0234094 A1* | 9/2010 | Gagner | G07F 17/32 463/20 |
| 2012/0133734 A1* | 5/2012 | Tokunaga et al. | 348/43 |
| 2012/0280920 A1* | 11/2012 | Jackson et al. | 345/173 |

FOREIGN PATENT DOCUMENTS

| | | |
|---|---|---|
| KR | 20100047990 A | 11/2010 |
| KR | 20110045589 A | 4/2011 |
| KR | 20110088969 A | 8/2011 |
| KR | 20110089969 A | 8/2011 |

OTHER PUBLICATIONS

Takayuki Iwamoto, et al: "Non-contact Method for Producing Tactile Sensation Using Airborne Ultrasound", Haptics: Perception, Devices and Scenarios Lecture Notes in Computer Science, vol. 5024; pp. 504-513; 6th International Conference, EuroHaptics 2008, Madrid, Spain, Jun. 10-13, 2008.

Yuriko Suzuki, et al; "Air Jet Driven Force Feedback in Virtual Reality", IEEE Computer Graphics and Applications, vol. 25, Issue 1; Jan.-Feb. 2005; pp. 44-47.

International Search Report mailed Mar. 22, 2013; PCT/KR2012/010926.

* cited by examiner

APPARATUS AND METHOD FOR PROVIDING TACTILE SENSATION FOR VIRTUAL IMAGE

CROSS-REFERENCE TO RELATED APPLICATIONS

This application is a National Phase Application of PCT International Application No. PCT/KR2012/010926, which was filed on Dec. 14, 2012, and which claims priority from Korean Patent Application No. 10-2011-0135408 filed with the Korean Intellectual Property Office on Dec. 15, 2011, and Korean Patent Application No. 10-2012-0120737 filed with the Korean Intellectual Property Office on Oct. 29, 2012. The disclosures of the above patent applications are incorporated herein by reference in their entirety.

BACKGROUND

1. Technical Field

Embodiments of the present invention relate to an apparatus and a method for providing a tactile sensation for a virtual image, more particularly to an apparatus and a method for providing a tactile sensation for a virtual image that enables a user to interact with a virtual image such as for a stereoscopic image and augmented reality.

2. Description of the Related Art

A virtual image, such as for a stereoscopic image and augmented reality, can provide the user with a sense of realism and verisimilitude and has been the subject of various studies.

In particular, the rapid commercialization of the 3-dimensional TV in recent times has made it possible to view 3-dimensional images in places other than specialized theaters, and the amount of contents that support stereoscopic images has increased accordingly.

A 2-dimensional image shown on a typical display screen may provide interaction with a user by way of a touch method. Korean Patent Publication No. 2010-0138193 discloses a method of providing interaction to a user based on a touch screen. However, this method only provides the user with visual interaction with respect to image information, so that it is difficult to provide interaction with verisimilitude.

In order to add realism to a virtual image, it is needed to provide tactile sensations for a corresponding virtual image, and it is needed to provide tactile sensations for such a virtual image through a terminal having a limited size, but as yet such function is not being provided.

SUMMARY

To resolve the above problem in the related art, an aspect of the present invention proposes an apparatus and a method for providing tactile sensations to provide the user with realistic interaction.

To achieve the objective above, an embodiment of the present invention provides an apparatus for providing a tactile sensation that includes: a display unit configured to display an image including a virtual image; an image acquisition unit configured to acquire an image of a user body; a determiner unit configured to determine whether or not a user is attempting an interaction with the virtual image by using an image acquired by the image acquisition unit; and a tactile-sensation provider unit configured to provide a tactile sensation to a preset body part of the user based on a determination result of the determiner unit.

The image acquisition unit may include two or more cameras.

The determiner unit may include: a recognition unit configured to recognize the preset body part from an image acquired by the image acquisition unit; a tracker unit configured to track a body part recognized by the recognition unit to determine a position of the recognized body part; and an interaction-determiner unit configured to determine whether or not a user is attempting an interaction with the virtual image based on position information of the preset body part tracked by the tracker unit and on whether or not the virtual image is being provided.

The virtual image may include a stereoscopic image and an augmented reality object.

In cases where the virtual image is a stereoscopic image, the interaction-determiner unit may determine that an interaction is attempted if the tracked body part is moved to or within a preset threshold from a display.

In cases where the virtual image is an augmented reality object, the interaction-determiner unit may determine that an interaction is attempted if the tracked body part is moved to or within a preset threshold from an augmented reality marker.

The tactile-sensation provider unit may provide a tactile sensation by ejecting compressed air.

Another aspect of the present invention provides an apparatus for providing a tactile sensation that includes: a display unit configured to display an image including a virtual image; an image acquisition unit configured to acquire an image of a user body; a determiner unit configured to determine whether or not a user is attempting an interaction with the virtual image by using an image acquired by the image acquisition unit; a content analyzer unit configured to acquire a time at which a virtual image is shown and position information of the shown virtual image from a displayed content; a tactile-sensation provider unit configured to provide a tactile sensation to a preset body part of the user based on a determination result of the determiner unit; and a tactile-sensation provision controller configured to adjust an ejector nozzle of the tactile-sensation provider unit based on a virtual image showing time and position acquired by the content analyzer unit.

Still another aspect of the present invention provides a method of providing a tactile sensation for a virtual image provided through a display unit that includes: (a) acquiring an image of a user body; (b) determining whether or not a user is attempting an interaction with the virtual image by using an image acquired in said step (a); and (c) providing a tactile sensation to a preset body part of the user based on a determination result of said step (b).

Yet another aspect of the present invention provides a method of providing a tactile sensation for a virtual image provided through a display unit that includes: (a) acquiring an image of a user body; (b) acquiring a time at which a virtual image is shown and position information of the shown virtual image from a displayed content; (c) adjusting an ejector nozzle for providing a tactile sensation in correspondence to a position of the virtual image, if the showing of the virtual image is predicted based on information acquired in said step (b); and (d) determining whether or not a user is attempting an interaction with the virtual image by using an image acquired in said step (a) and information on whether or not the virtual image is shown; and (e) providing a tactile sensation to a preset body part of the user based on a determination result of the determiner unit.

The present invention can enable the user to interact with a virtual image with verisimilitude.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

An aspect of the present invention is to propose an apparatus and a method for providing a tactile sensation in order to provide the user with an interaction having verisimilitude when the user touches a stereoscopic image.

Certain embodiments of the present invention are described below in more detail with reference to the accompanying drawings.

Figure 1:
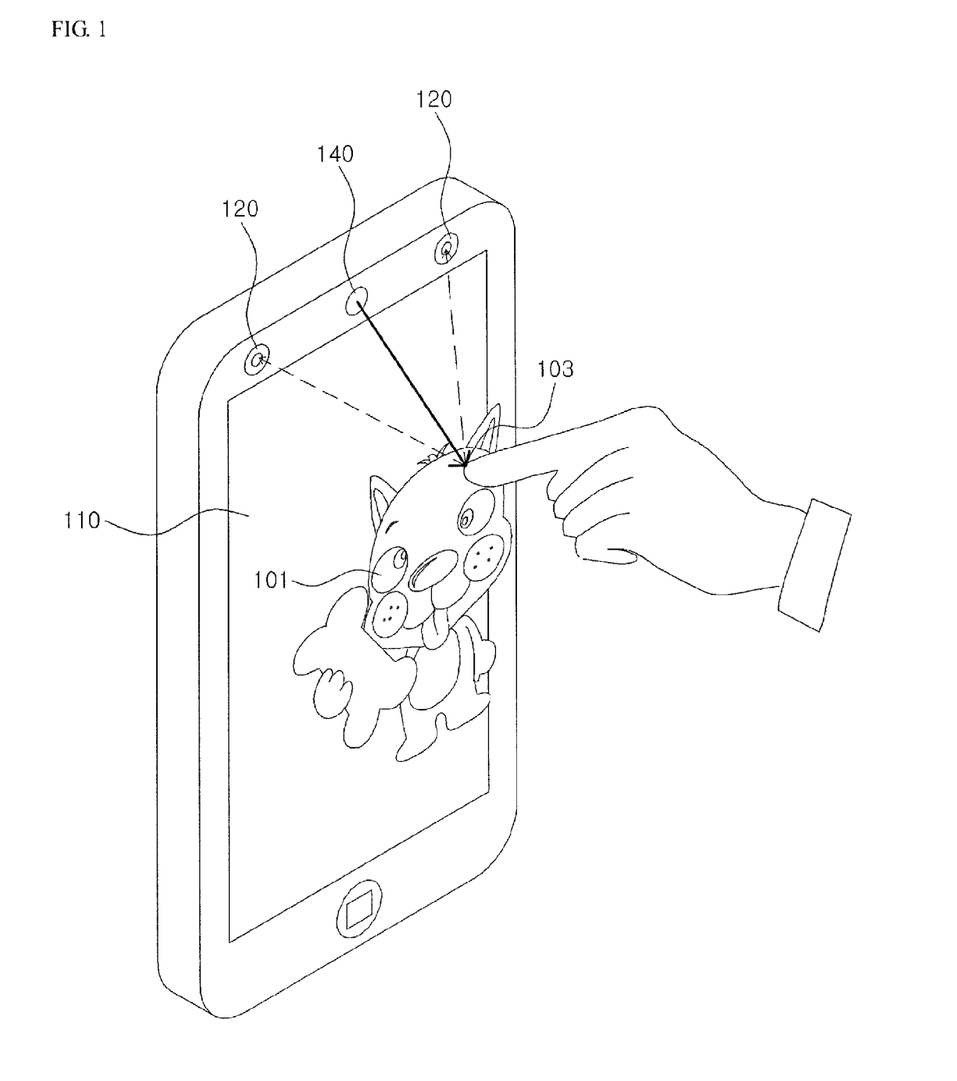
FIG. 1 illustrates an example of an apparatus for providing tactile sensations according to an embodiment of the present invention.

FIG. 1 illustrates an example of an apparatus for providing tactile sensations according to an embodiment of the present invention.

Referring to FIG. 1, if a preset body part 103 of the user, such as the user's hand, approaches a virtual image 101 displayed on the displayed unit 110, the tactile-sensation provider unit may provide a tactile sensation to the body part.

FIG. 1 illustrates a stereoscopic image shown projecting from the display, as an example of a virtual image 101. A virtual image 101 to which an embodiment of the present invention may apply can also include an augmented reality image besides a stereoscopic image. That is, the scope of a virtual image in an embodiment of the present invention can also encompass an augmented reality object shown on a real background.

An apparatus for providing tactile sensations according to the present invention may provide the user with tactile information when the user attempts an interaction with the virtual image. For example, if the user uses a hand, from among the user's body parts, to attempt an interaction with the virtual image, the apparatus for providing tactile sensations according to an embodiment of the present invention may provide a tactile sensation to the user's hand.

For example, if a hand moves near to a stereoscopic image to attempt an interaction as in FIG. 1, then the tactile-sensation provider unit 140 may provide tactile information to the user's hand.

According to an embodiment of the present invention, the tactile-sensation provider unit 140 can provide the tactile information by ejecting compressed air to the user's hand.

The determining of whether or not an interaction with the stereoscopic image 101 is attempted may be performed based on the position of the user's hand. For instance, it may be determined that the user is attempting an interaction with the shown stereoscopic image if the user's hand is near the display.

Also, by using the depth information for the stereoscopic image, it can be determined that an interaction is attempted if the user's hand is at a position corresponding to the depth information of the stereoscopic image or is within a preset distance from a position corresponding to the depth information of the stereoscopic image. That is, if the depth information used for the stereoscopic image is a preset value, then it can be determined that an interaction is attempted if the user's hand is present at a position within the preset range.

The position of the user's hand may be estimated by analyzing images acquired by the image acquisition unit 120.

In cases where the virtual image is not a stereoscopic image such as that shown in FIG. 1 but is an augmented reality object, it may be determined that the user is attempting an interaction with the augmented reality object if the user's hand is near a marker for showing the augmented reality object.

The images shown on the display can be classified into regular images that are shown on the display plane and virtual images such as stereoscopic images and augmented reality objects. The term "virtual image" used herein is differentiated from regular images shown on the display and refers to a stereoscopic image object shown projecting from the display or an augmented reality object shown virtually by a marker, etc.

Thus, the image 101 shown in a projecting manner in FIG. 1 corresponds to a virtual image, while images shown on the display plane differentiated from the virtual image are not included in the scope of a virtual image.

Figure 2:
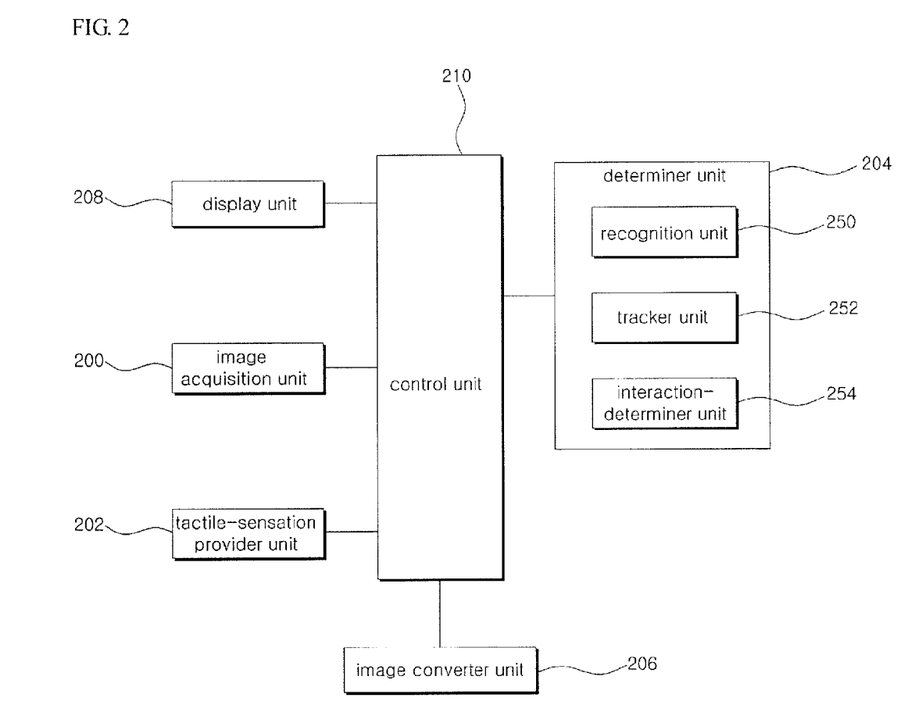
FIG. 2 is a block diagram illustrating the modular composition of an apparatus for providing tactile sensations according to a first disclosed embodiment of the present invention.

FIG. 2 is a block diagram illustrating the modular composition of an apparatus for providing tactile sensations according to a first disclosed embodiment of the present invention.

Referring to FIG. 2, an apparatus for providing tactile sensations according to an embodiment of the present invention can include an image acquisition unit 200, a tactile-sensation provider unit 202, a determiner unit 204, an image converter unit 206, a display unit 208, and a control unit 210.

The control unit 210 may generally control the operations of the components of the apparatus for providing tactile sensations.

The display unit 208 may display images, and the images shown by the display may include a virtual image such as a stereoscopic image and an augmented reality object.

The user may be required to wear 3D glasses in order to recognize stereoscopic images displayed on the display unit 208.

The image acquisition unit 200 may acquire images of the user body positioned in front of the display unit 208. The image acquisition unit can include, but is not limited to, cameras that photograph images of the user body.

According to a preferred embodiment of the present invention, the image acquisition unit 200 may preferably include two or more cameras that are capable of acquiring 3-dimensional image information of the user's body.

The determiner unit 204 may determine whether or not to provide a tactile sensation to a preset body part of the user (e.g. the hand) by using the images acquired at the image acquisition unit 200 and the image information displayed through the display unit 208.

Also, the determiner unit 204 can determine whether or not to provide a tactile sensation based on whether or not a virtual image that allows interaction is being provided to the user and on whether or not the user is attempting to interact with the virtual image. That is, the determiner unit 204 can determine that it is needed to provide a tactile sensation when a virtual image is being provided and the user attempts to interact with the virtual image.

According to an embodiment of the present invention, the determiner unit 204 may include a recognition unit 250, a tracker unit 252, and an interaction-determiner unit 254.

The recognition unit 250 may serve to recognize a preset body part of the user from the images acquired through the image acquisition unit 200. For example, the recognition unit 250 may serve to recognize the user's hand portion from the images of the user body obtained from the image acquisition unit 200. There are many known methods for recognizing a particular body part of the user from images; therefore, a detailed description of such methods is omitted.

The tracker unit 252 may track the movement of the recognized body part (e.g. the hand) of the user. A separate sensor can also be used in order to identify the position of the user's hand more precisely.

The interaction-determiner unit 254 may determine whether or not the user is attempting an interaction with the virtual image through the information tracked by the tracker unit 252, and based on this, may determine whether or not to provide a tactile sensation.

As described above, if the user brings a hand near in the direction of the stereoscopic image (the direction of the display) or brings a hand near a marker for showing an augmented reality, then it can be determined that the user is attempting an interaction with the virtual image.

The tactile-sensation provider unit 202 may provide a tactile sensation to a preset body part (the hand) if the determiner unit 204 determines that it is necessary to provide a tactile sensation. According to a preferred embodiment of the present invention, the tactile-sensation provider unit 202 can be an ejector that ejects compressed air.

As illustrated in FIG. 1, the tactile-sensation provider unit 202 can be installed on a front surface of the display device and can eject compressed air when the user's hand is brought near. When ejecting the compressed air, the compressed air can be ejected based on the position information tracked by the tracker unit 252 of the determiner unit 204.

In cases where an embodiment of the present invention is applied to augmented reality, the tactile-sensation provider unit 202 can also be installed on a back surface of the display device and can eject compressed air when the user's hand is brought near a marker.

The image converter unit 206 may serve to convert the virtual image by a preset method if the user attempts to interact with the virtual image. For example, the image converter unit 206 can convert the image such that the virtual image is shaken, when the user attempts to interact with the virtual image.

Figure 3:
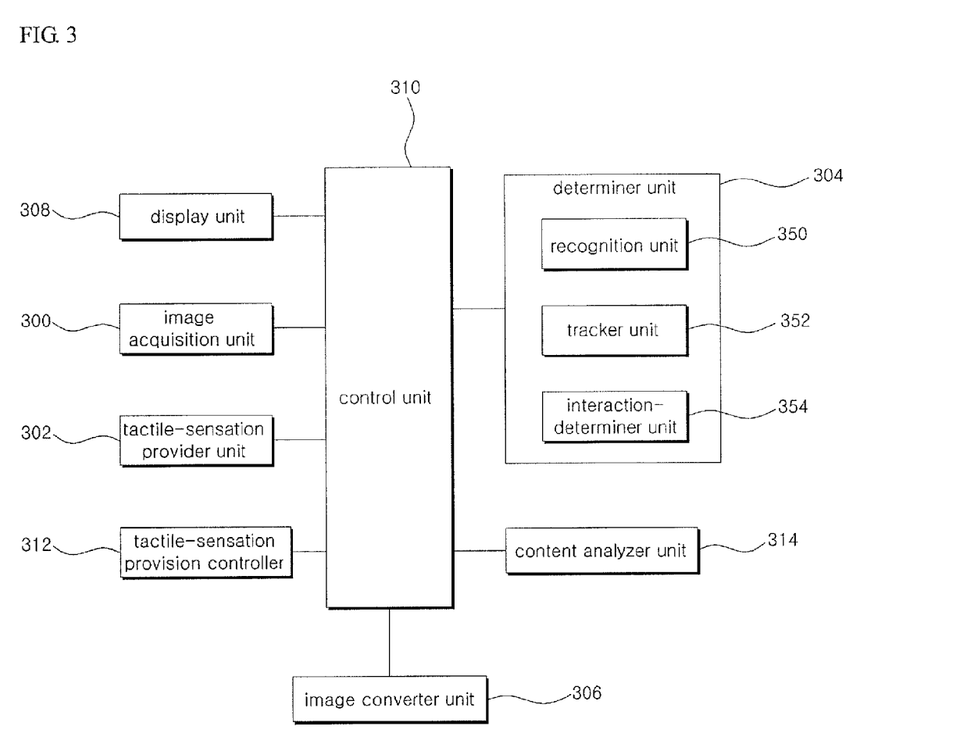
FIG. 3 is a block diagram illustrating the modular composition of an apparatus for providing tactile sensations according to a second disclosed embodiment of the present invention.

FIG. 3 is a block diagram illustrating the modular composition of an apparatus for providing tactile sensations according to a second disclosed embodiment of the present invention.

Referring to FIG. 3, an apparatus for providing tactile sensations according to a second disclosed embodiment of the present invention can include an image acquisition unit 300, a tactile-sensation provider unit 302, a determiner unit 304, an image converter unit 306, a display unit 308, a control unit 310, a tactile-sensation provision controller 312, and a content analyzer unit 314.

In the block diagram of FIG. 3, the functions of the image acquisition unit 300, tactile-sensation provider unit 302, determiner unit 304, image converter unit 306, display unit 308, and control unit 310 are the same as those of the components of the apparatus for providing tactile sensations illustrated in FIG. 2.

The image acquisition unit 300 acquires images of the user's body, and the determiner unit 304 determines whether or not the user attempts an interaction with the virtual image by recognizing a preset body part from the images acquired by the image acquisition unit 304 and tracking the body part.

If it is determined at the determiner unit 304 that the user is attempting an interaction with the virtual image, the tactile-sensation provider unit 302 may eject compressed air to provide a tactile sensation.

The apparatus for providing tactile sensations according to the second disclosed embodiment of the present invention, as illustrated in FIG. 3, differs from the first disclosed embodiment of the invention in that the content may be analyzed beforehand and the position of the nozzle may be pre-adjusted such that the compressed air ejector nozzle of the tactile-sensation provider unit faces the virtual image beforehand, in order to avoid delays in providing the user with tactile sensations.

Figure 4:
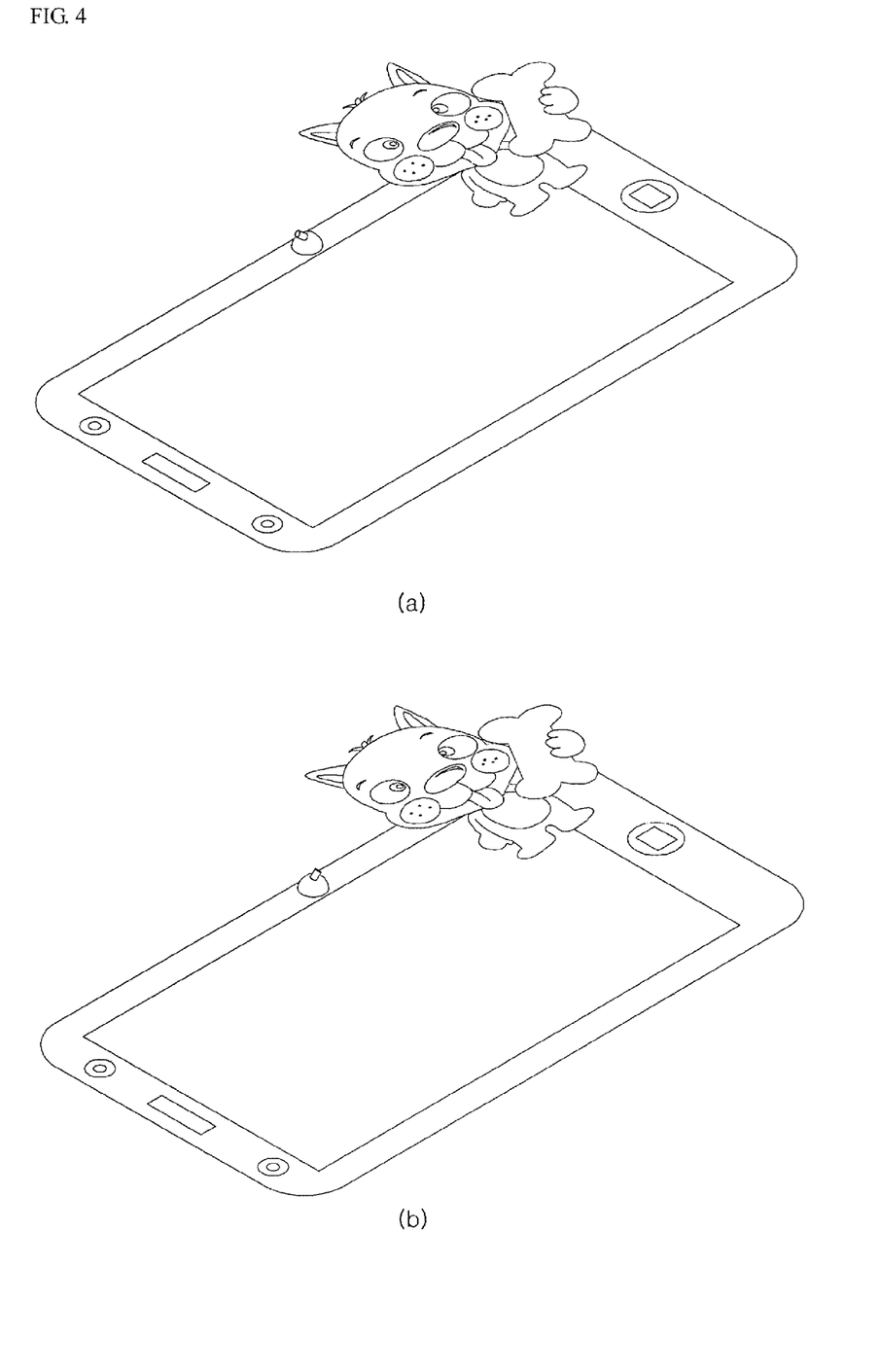
FIG. 4A and FIG. 4B illustrates the need for presetting the position of the ejector nozzle in an apparatus for providing tactile sensations according to the second disclosed embodiment of the present invention.

FIG. 4A and FIG. 4B illustrate the need for presetting the position of the ejector nozzle in an apparatus for providing tactile sensations according to the second disclosed embodiment of the present invention.

Referring to FIG. 4A, a virtual image is shown at the right side of a display device, while the ejector nozzle is positioned to eject compressed air towards the left side of the display device.

If a virtual image is being provided as in FIG. 4A when it is determined that the user is attempting to interact with the virtual image, then the ejector nozzle may eject the compressed air after moving to the position of the virtual image.

In cases where the compressed air is ejected after the ejector nozzle is moved to the position of the virtual image, then a delay can occur when providing a tactile sensation, because the compressed air is ejected after the ejector nozzle is moved.

An apparatus for providing tactile sensations according to the second disclosed embodiment of the present invention may adjust the position of the nozzle of the apparatus, as in FIG. 4B, to prevent the occurrence of such delay. If it is predicted that a virtual image will be displayed at the right side of the display device, then the apparatus for providing tactile sensations according to the second disclosed embodiment may adjust the position of the nozzle beforehand towards the right side.

Because of this, when the user attempts to interact with the shown virtual image, it is possible to provide a tactile sensation immediately without delay.

In order to perform the operation described above, an apparatus for providing tactile sensations according to the second disclosed embodiment may additionally include a tactile-sensation provision controller 312 and a content analyzer unit 314.

The content analyzer unit 314 may acquire position information of the virtual image that is to be shown, from the content being displayed through the display device.

According to an embodiment of the present invention, the content analyzer unit 314 may acquire time information and position information at which the virtual image is to be shown, and may provide the acquired information to the tactile-sensation provision controller 312.

In one example, the content analyzer unit 314 can analyze content data to extract the time information and position information. In another example, the content analyzer unit 314 can receive the play time and position information of the virtual image beforehand, and based on such information, can provide the time information and position information of the virtual image to the tactile-sensation provision controller 312.

The acquiring of the time information and position information of the virtual image at the content analyzer unit 314 can be achieved by various methods other than the method described above, and it would be obvious to those skilled in the art that changing the method of acquisition has no bearing on the scope of the present invention.

The tactile-sensation provision controller 312 may use the time information and position information of the virtual image provided from the content analyzer unit 314 to provide control information for adjusting the position of the ejector nozzle of the tactile-sensation provider unit 302.

The tactile-sensation provision controller 312 may provide the control information to adjust the position of the ejector nozzle such that the ejector nozzle is positioned in correspondence to the position of the virtual image before the virtual image is shown. For example, if it is predicted from the analysis information of the content analyzer unit 314 that a virtual image will be shown at the center of the display screen at the play time of 1 minute 20 seconds, then the tactile-sensation provision controller 312 may provide the control information such that the ejector nozzle faces the center of the screen before the 1 minute 20 second play time.

After the position of the ejector nozzle of the tactile-sensation provider unit 302 is preset according to the control of the tactile-sensation provision controller 312, if the determiner unit 304 determines that the user is attempting an interaction with the virtual image, then the tactile-sensation provider unit may eject compressed air to the user's hand that was being tracked.

When the user attempts to interact with the virtual image, the user's hand would move to the position of the virtual image, and since the ejector nozzle is set beforehand to face the virtual image, the user can be provided with a tactile sensation without a particular delay.

Figure 5:
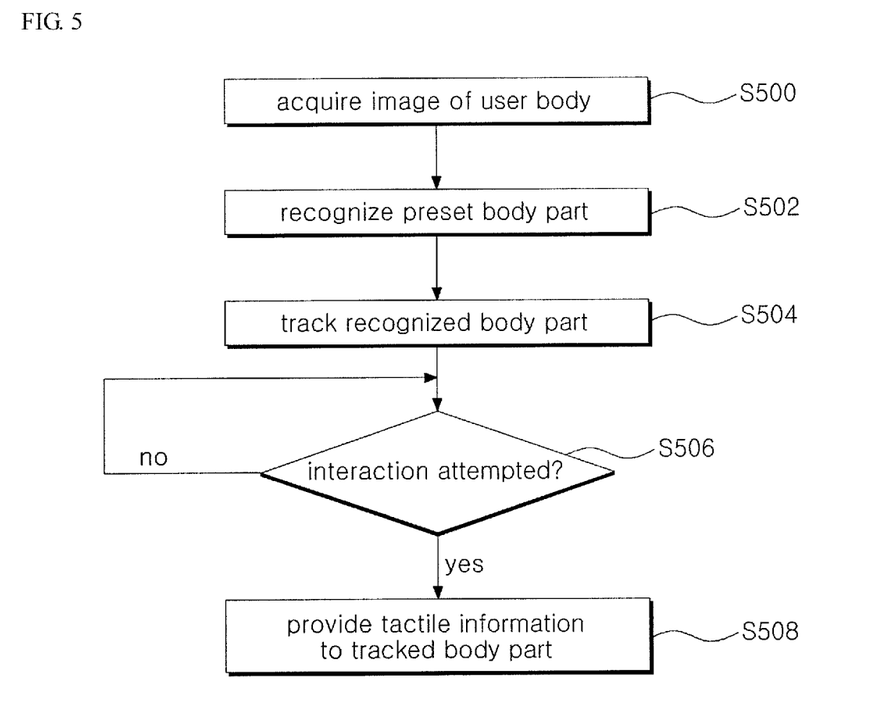
FIG. 5 is a flowchart illustrating the operations of an apparatus for providing tactile sensations according to an embodiment of the present invention.

FIG. 5 is a flowchart illustrating the operations of an apparatus for providing tactile sensations according to an embodiment of the present invention.

Referring to FIG. 5, an apparatus for providing tactile sensations according to an embodiment of the present invention may use an image acquisition means such as a camera to acquire images of a user body (step 500). In order to obtain 3-dimensional position information of the user body, it may be preferable to use two or more cameras for acquiring the images.

When the images of the user body are acquired, a preset body part may be recognized from the acquired images (step 502). Since the user's hand would mainly be used in the interaction, as described above, the user's hand can be recognized from the acquired images.

When a particular body part is recognized from the acquired images, the recognized body part may be tracked (step 504). To be more specific, the position information of the recognized body part (hand) may be tracked, and information on the distance from the display can be tracked in cases where the virtual image is a stereoscopic image, while information on the distance from the marker can be tracked in cases where the virtual image is an augmented reality object.

While tracking the recognized body part, it may be determined whether or not the user attempts an interaction with the virtual image (step 506). As described above, it can be determined that the user is attempting an interaction when the user moves a body part (the hand), which is being tracked, near to the virtual image.

If it is determined that the user is attempting to interact with the virtual image, a tactile sensation may be provided to the body part being tracked (step 508). A tactile-sensation provider unit may provide a tactile sensation based on the position information of the body part being tracked, and as described above, can provide the tactile sensation by ejecting compressed air onto the body part.

Although it is not illustrated in FIG. 5, when the user attempts to interact with the virtual image, the virtual image can be changed in response to the user's interaction.

Figure 6:
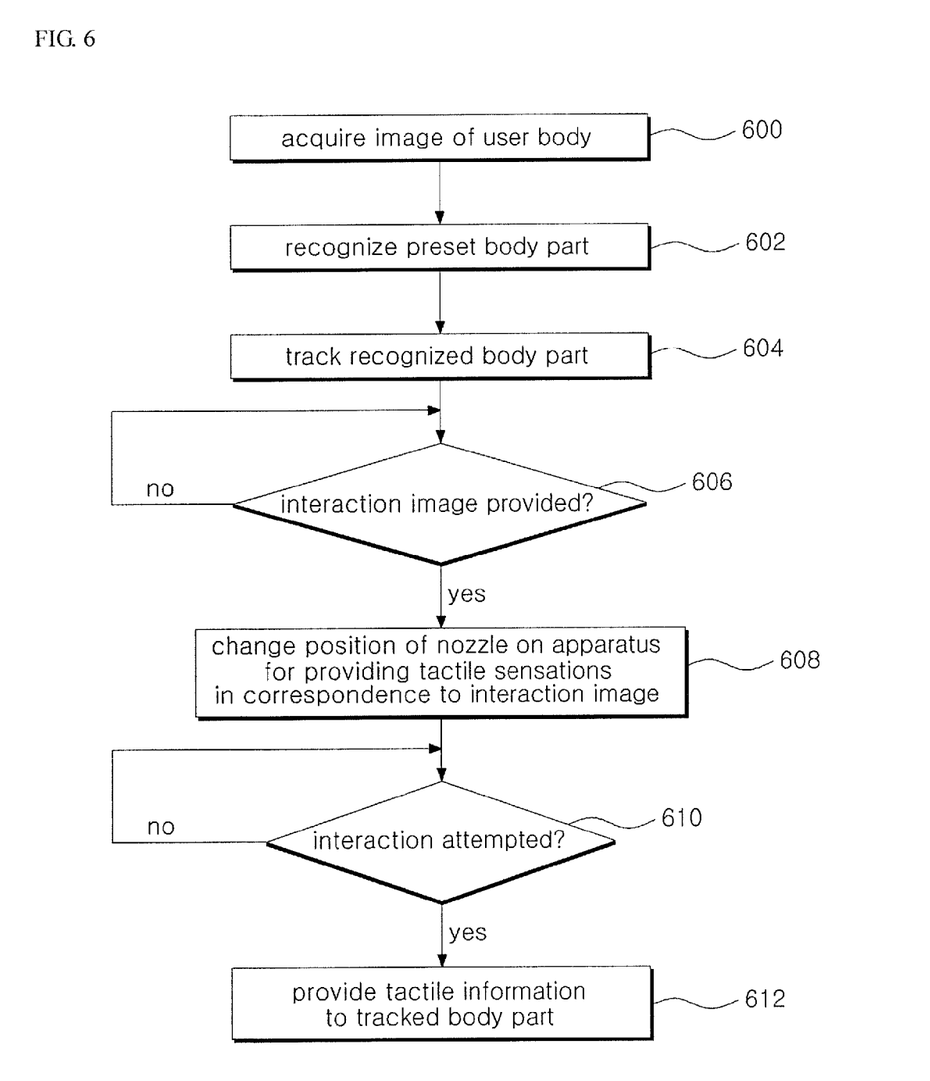
FIG. 6 is a flowchart illustrating the operations of an apparatus for providing tactile sensations according to another embodiment of the present invention.

FIG. 6 is a flowchart illustrating the operations of an apparatus for providing tactile sensations according to another embodiment of the present invention.

Referring to FIG. 6, the procedures for acquiring images of the user body (step 600), recognizing a preset body part (step 602), and tracking the recognized body part (step 604) may be performed in the same way as in FIG. 5.

Based on the analysis results of the content analyzer unit, it may be determined whether or not it is time when a virtual image is to be shown (step 606).

If it is time when a virtual image is to be shown, the position of the nozzle of the tactile-sensation provider unit may be adjusted based on the position information of the virtual image acquired by the content analyzer unit (step 608).

By tracking the body part of the user, it may be determined whether or not the user attempts to interact with the virtual image (step 610).

If the user attempts an interaction with the virtual image, a tactile sensation may be provided to the body part being tracked (step 612).

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

The invention claimed is:

1. An apparatus for providing a tactile sensation, the apparatus comprising:
   a display unit configured to display an image including a virtual image;
   an image acquisition unit configured to acquire an image of a user body;
   a determiner unit configured to determine whether or not a user is attempting an interaction with the virtual image by using an image acquired by the image acquisition unit;
   a tactile-sensation provider unit configured to provide a tactile sensation to a preset body part of the user based on a determination result of the determiner unit;
   a tactile-sensation provision controller configured to adjust a position of an ejector nozzle of the tactile-sensation provider such that the ejector nozzle is positioned in correspondence to the position of the virtual image; and wherein, when a showing of a virtual image is predicted, the tactile-sensation provision controller adjusts the position of the ejector nozzle in correspondence to the position of the virtual image.

2. The apparatus for providing a tactile sensation according to claim 1, wherein the image acquisition unit comprises two or more cameras.

3. The apparatus for providing a tactile sensation according to claim 1, wherein the determiner unit comprises:
 a recognition unit configured to recognize the preset body part from an image acquired by the image acquisition unit;
 a tracker unit configured to track a body part recognized by the recognition unit to determine a position of the recognized body part; and
 an interaction-determiner unit configured to determine whether or not a user is attempting an interaction with the virtual image based on position information of the preset body part tracked by the tracker unit.

4. The apparatus for providing a tactile sensation according to claim 1, wherein the virtual image comprises a stereoscopic image and an augmented reality object.

5. The apparatus for providing a tactile sensation according to claim 4, wherein, when the virtual image comprises a stereoscopic image, the interaction-determiner unit determines that an interaction is attempted if the tracked body part is moved to or within a preset threshold from a display.

6. The apparatus for providing a tactile sensation according to claim 4, wherein, when the virtual image comprises an augmented reality object, the interaction-determiner unit determines that an interaction is attempted if the tracked body part is moved to or within a preset threshold from an augmented reality marker.

7. The apparatus for providing a tactile sensation according to claim 1, wherein the tactile-sensation provider unit provides a tactile sensation by ejecting compressed air.

8. An apparatus for providing a tactile sensation, the apparatus comprising:
 a display unit configured to display an image including a virtual image;
 an image acquisition unit configured to acquire an image of a user body;
 a determiner unit configured to determine whether or not a user is attempting an interaction with the virtual image by using an image acquired by the image acquisition unit;
 a content analyzer unit configured to acquire a time at which a virtual image is shown and position information of the shown virtual image from a displayed content;
 a tactile-sensation provider unit configured to provide a tactile sensation to a preset body part of the user based on a determination result of the determiner unit;
 a tactile-sensation provision controller configured to adjust a position of an ejector nozzle of the tactile-sensation provider unit in correspondence to a position of the virtual image based on a virtual image showing time and position acquired by the content analyzer unit, and when a showing of a virtual image is predicted based on the virtual image showing time, the tactile-sensation provision controller adjusts the position of the ejector nozzle in correspondence to the position of the virtual image.

9. The apparatus for providing a tactile sensation according to claim 8, wherein the determiner unit comprises:
 a recognition unit configured to recognize the preset body part from an image acquired by the image acquisition unit;
 a tracker unit configured to track a body part recognized by the recognition unit to determine a position of the recognized body part; and
 an interaction-determiner unit configured to determine whether or not a user is attempting an interaction with the virtual image based on position information of the preset body part tracked by the tracker unit.

10. The apparatus for providing a tactile sensation according to claim 8, wherein the virtual image comprises a stereoscopic image and an augmented reality object.

11. The apparatus for providing a tactile sensation according to claim 9, wherein, when the virtual image comprises a stereoscopic image, the interaction-determiner unit determines that an interaction is attempted if the tracked body part is moved to or within a preset threshold from a display.

12. The apparatus for providing a tactile sensation according to claim 9, wherein, when the virtual image comprises an augmented reality object, the interaction-determiner unit determines that an interaction is attempted if the tracked body part is moved to or within a preset threshold from an augmented reality marker.

13. A method of providing a tactile sensation for a virtual image provided through a display unit, the method comprising:
 (a) acquiring an image of a user body;
 (b) determining whether or not a user is attempting an interaction with the virtual image by using an image acquired in said step (a);
 (c) providing a tactile sensation to a preset body part of the user based on a determination result of said step (b); and
 (d) adjusting a position of an ejector nozzle for providing a tactile sensation in correspondence to a position of the virtual image when a showing of the virtual image is predicted.

14. A method of providing a tactile sensation for a virtual image provided through a display unit, the method comprising:
 (a) acquiring an image of a user body;
 (b) acquiring a time at which a virtual image is shown and position information of the shown virtual image from a displayed content;
 (c) adjusting a position of an ejector nozzle for providing a tactile sensation in correspondence to a position of the virtual image when a showing of the virtual image is predicted;
 (d) determining whether or not a user is attempting an interaction with the virtual image by using an image acquired in said step (a) and information on whether or not the virtual image is shown; and
 (e) providing a tactile sensation to a preset body part of the user based on a determination result of the determiner unit.

* * * * *